US008952796B1

(12) United States Patent  
Wolf et al.

(10) Patent No.: US 8,952,796 B1
(45) Date of Patent: Feb. 10, 2015

(54) ENACTIVE PERCEPTION DEVICE

(75) Inventors: Warren L. Wolf, Austin, TX (US); Manu Rehani, Portland, OR (US)

(73) Assignee: DW Associates, LLC, Austin, TX (US)

(*) Notice: Subject to any disclaimer, the term of this patent is extended or adjusted under 35 U.S.C. 154(b) by 246 days.

(21) Appl. No.: 13/535,206

(22) Filed: Jun. 27, 2012

Related U.S. Application Data

(60) Provisional application No. 61/501,953, filed on Jun. 28, 2011.

(51) Int. Cl.
H04B 3/36 (2006.01)
G08B 7/00 (2006.01)

(52) U.S. Cl.
CPC ................................. G08B 7/00 (2013.01)
USPC ............................ 340/407.1; 340/500

(58) Field of Classification Search
CPC .................................. G06F 3/016; G08B 6/00
USPC .............................. 340/407.1, 500
See application file for complete search history.

(56) References Cited

U.S. PATENT DOCUMENTS

| 5,128,865 A | 7/1992 | Sadler |
| 5,249,967 A | 10/1993 | O'Leary et al. |
| 5,454,722 A | 10/1995 | Holland et al. |
| 5,533,181 A | 7/1996 | Bergsneider |
| 5,781,879 A | 7/1998 | Arnold et al. |
| 5,797,123 A | 8/1998 | Chou et al. |
| 5,857,855 A | 1/1999 | Katayama |
| 5,887,120 A | 3/1999 | Wical |
| 5,961,333 A | 10/1999 | Harrison et al. |
| 6,126,449 A | 10/2000 | Burns |
| 6,138,085 A | 10/2000 | Richardson et al. |
| 6,173,261 B1 | 1/2001 | Arai et al. |
| 6,385,620 B1 | 5/2002 | Kurzius et al. |
| 6,453,315 B1 | 9/2002 | Weissman et al. |
| 6,504,990 B1 | 1/2003 | Abecassis |
| 6,523,026 B1 | 2/2003 | Gillis |
| 6,556,964 B2 | 4/2003 | Haug et al. |
| 6,684,202 B1 | 1/2004 | Humphrey et al. |
| 7,403,890 B2 | 7/2008 | Roushar |
| 7,487,094 B1 | 2/2009 | Konig et al. |
| 7,539,697 B1 | 5/2009 | Akella et al. |
| 7,555,441 B2 | 6/2009 | Crow et al. |
| 7,565,403 B2 | 7/2009 | Horvitz et al. |
| 7,567,895 B2 | 7/2009 | Chen et al. |

(Continued)

FOREIGN PATENT DOCUMENTS

| JP | 2002149675 | 5/2002 |
| JP | 2004157931 | 6/2004 |
| WO | 2012000013 | 1/2012 |

OTHER PUBLICATIONS

Office Action dated May 5, 2009, U.S. Appl. No. 11/419,324, filed May 19, 2006 entitled "System and Method for Authoring and Learning".

(Continued)

Primary Examiner — Kerri McNally
(74) Attorney, Agent, or Firm — Marger Johnson & McCollom PC

(57) ABSTRACT

An enactive perception device includes the ability to receive information. The information received can be either sensory information or other data. The received information can then be converted into sensory information, which can then be provided to the user.

17 Claims, 5 Drawing Sheets

(56) References Cited

U.S. PATENT DOCUMENTS

| | | | |
|---|---|---|---|
| 7,607,083 B2 | 10/2009 | Gong et al. |
| 7,644,144 B1 | 1/2010 | Horvitz et al. |
| 7,711,573 B1 | 5/2010 | Obeid |
| 7,711,672 B2 | 5/2010 | Au |
| 7,720,675 B2 | 5/2010 | Burstein et al. |
| 7,792,685 B2 | 9/2010 | Andino, Jr. et al. |
| 7,813,917 B2 | 10/2010 | Shuster |
| 7,870,203 B2 | 1/2011 | Judge et al. |
| 7,917,587 B2 | 3/2011 | Zeng et al. |
| 7,966,265 B2 | 6/2011 | Schalk et al. |
| 8,090,725 B1 | 1/2012 | Cranfill |
| 2002/0059376 A1 | 5/2002 | Schwartz |
| 2002/0099730 A1 | 7/2002 | Brown et al. |
| 2002/0106622 A1 | 8/2002 | Osborne et al. |
| 2003/0027121 A1 | 2/2003 | Grudnitski et al. |
| 2003/0028564 A1 | 2/2003 | Sanfilippo |
| 2003/0093322 A1 | 5/2003 | Sciuk |
| 2003/0167266 A1 | 9/2003 | Saldanha et al. |
| 2003/0182310 A1 | 9/2003 | Charnock et al. |
| 2004/0030556 A1 | 2/2004 | Bennett |
| 2004/0053203 A1 | 3/2004 | Walters et al. |
| 2004/0117234 A1 | 6/2004 | Lindsay-Scott et al. |
| 2005/0055209 A1 | 3/2005 | Epstein |
| 2005/0165600 A1 | 7/2005 | Kasravi et al. |
| 2005/0192949 A1 | 9/2005 | Kojima |
| 2005/0197890 A1 | 9/2005 | Lu et al. |
| 2005/0202871 A1 | 9/2005 | Lippincott |
| 2005/0204337 A1 | 9/2005 | Diesel et al. |
| 2005/0262428 A1 | 11/2005 | Little et al. |
| 2005/0272517 A1 | 12/2005 | Funk et al. |
| 2005/0282141 A1 | 12/2005 | Falash et al. |
| 2006/0206332 A1 | 9/2006 | Paek et al. |
| 2006/0230102 A1 | 10/2006 | Hidary |
| 2006/0235843 A1 | 10/2006 | Musgrove et al. |
| 2006/0246973 A1 | 11/2006 | Thomas et al. |
| 2007/0061179 A1 | 3/2007 | Henderson et al. |
| 2007/0112710 A1 | 5/2007 | Drane et al. |
| 2007/0135225 A1 | 6/2007 | Nieminen et al. |
| 2007/0196798 A1 | 8/2007 | Pryor et al. |
| 2007/0203991 A1 | 8/2007 | Fisher et al. |
| 2007/0213126 A1 | 9/2007 | Deutsch et al. |
| 2007/0259324 A1 | 11/2007 | Frank |
| 2007/0260421 A1 | 11/2007 | Berner et al. |
| 2007/0265089 A1 | 11/2007 | Robarts et al. |
| 2008/0052283 A1 | 2/2008 | Jensen et al. |
| 2008/0120029 A1* | 5/2008 | Zelek et al. | 701/213 |
| 2008/0191864 A1 | 8/2008 | Wolfson |
| 2008/0281620 A1 | 11/2008 | Schalk et al. |
| 2008/0300930 A1 | 12/2008 | Compitello et al. |
| 2009/0006164 A1 | 1/2009 | Kaiser et al. |
| 2009/0024554 A1 | 1/2009 | Murdock et al. |
| 2009/0024747 A1 | 1/2009 | Moses et al. |
| 2009/0035736 A1 | 2/2009 | Wolpert et al. |
| 2009/0153350 A1* | 6/2009 | Steger et al. | 340/825.2 |
| 2009/0198488 A1 | 8/2009 | Vigen |
| 2009/0248399 A1 | 10/2009 | Au |
| 2009/0282104 A1 | 11/2009 | O'Sullivan et al. |
| 2009/0287672 A1 | 11/2009 | Chakrabarti et al. |
| 2009/0292541 A1 | 11/2009 | Daya et al. |
| 2009/0319508 A1 | 12/2009 | Yih et al. |
| 2010/0023377 A1 | 1/2010 | Sheridan |
| 2010/0098289 A1 | 4/2010 | Tognoli |
| 2010/0145678 A1 | 6/2010 | Csomai et al. |
| 2010/0179916 A1 | 7/2010 | Johns et al. |
| 2010/0228733 A1 | 9/2010 | Harrison et al. |
| 2010/0271298 A1* | 10/2010 | Vice et al. | 345/156 |
| 2010/0306251 A1 | 12/2010 | Snell |
| 2010/0328051 A1* | 12/2010 | Hale et al. | 340/407.1 |
| 2011/0040837 A1 | 2/2011 | Eden et al. |
| 2011/0055098 A1 | 3/2011 | Stewart |
| 2011/0184939 A1 | 7/2011 | Elliott |
| 2011/0208511 A1 | 8/2011 | Sikstrom et al. |
| 2011/0258049 A1 | 10/2011 | Schwartz |
| 2011/0268300 A1* | 11/2011 | DeMers et al. | 381/309 |
| 2011/0295759 A1 | 12/2011 | Selvakummar et al. |

OTHER PUBLICATIONS

Van Rijk, R et al., Using CrisisKit and MOPED to Improve Emergency Management Team Training, Proceedings ISCRAM 2004, Brussels, May 3-4, 2004. pp. 161-166.

Thomas, P.G. et al., AESOP—An Electronic Student Observatory Project, Frontiers in Education, 1998, 5 pages.

Loftin, R.B. et al., Training the Hubble Space Telescope Flight Team, IEEE Computer Graphics and Applications, 1995, pp. 31-37.

Office Action dated Jun. 16, 2008, U.S. Appl. No. 11/419,317, filed May 19, 2006 entitled "Method for Interactive Training and Learning."

Office Action dated Oct. 31, 2008, U.S. Appl. No. 11/419,317, filed May 19, 2006 entitled "Method for Interactive Training and Learning."

Office Action dated Jun. 16, 2009 U.S. Appl. No. 11/419,317, filed May 19, 2006 entitled "Method for Interactive Training and Learning."

Office Action dated Nov. 17, 2009 U.S. Appl. No. 11/419,317, filed May 19, 2006 entitled "Method for Interactive Training and Learning."

Aiolli, Fabio; Sebastiani, Fabrizio; Sperduti, Alessandro, Preference Learning for Category-Ranking Based Interactive Text Cagegorization, Proceedings of International Joint Conference on Neural Networks, ICJNN 2007, Orlando, FL, Aug. 12-17, 2007, pp. 2034-2039.

Mood Indicator Based on History of Electronic Communication Thread, IPCOM, Disclosure No. IPCOM000198194D, Jul. 29, 2010, 3 pages, retrieved from http://ip.com/IPCOM/000198194.

Keh, Huan-Chao, The Chinese Text Categorization System with Category Priorities, Journal of Software, Oct. 2010, vol. 5, No. 10, pp. 1137-1143.

R. Hawkins and M. Russell, Document Categorization Using Lexical Analysis and Fuzzy Sets, IBM Technical Disclosure Bulletin, Jun. 1992, vol. 35, No. 1A, 1 pg.

Lingway Vertical Search Solutions, Lingway HR Suite, "Lingway e-Recruitment Applications: a Semantic Solution for Recruitment", retrieved from http://www.lingway.com/images/pdf/fichelhrslea07anglaisweb.pdf on Jun. 17, 2012 (2 pages).

Tseng, "Semantic Classification of Chinese unknown words", ACL '03 Proceedings of the 41st Annual Meeting on Association for Computational Linguistics—vol. 2 Association for Computational Linguistics Stroudsburg, PA, USA © 2003.

Mohammad, "Measuring Semantic Distance Using Distributional Profiles of Concepts", a thesis submitted in conformity with the requirements for the degree of Graduate Department of Computer Science University of Toronto, 2008, pp. 1-167.

Mohammad, et al., "Measuring Semantic Distance Using Distributional Profiles of Concepts", Association for Computational Linguistics; retrieved at http://www.umiacs.umd.edu/~saif/WebDocs/Measuring-Semantic-Distance.pdf, 2006, pp. 1-34.

* cited by examiner

US 8,952,796 B1

ENACTIVE PERCEPTION DEVICE

RELATED APPLICATION DATA

This application claims the benefit of U.S. Provisional Patent Application Ser. No. 61/501,953, titled "ENACTIVE PERCEPTION DEVICE", filed Jun. 28, 2011, which is herein incorporated by reference for all purposes.

FIELD

This invention pertains to information, and more particularly to easier processing of incoming information.

BACKGROUND

The need to externally process (in some way) information and convey that information to a user has been around for a long time. For example, blind persons can use canes or Seeing Eye dogs to navigate: these devices translate information that would normally be processed visually into another sense that the blind person can perceive: in this case, the sense of touch.

Military applications of data processing also exist. In the early days of air warfare, the pilot (usually the sole person in the plane, and therefore also responsible for firing the weapons) had to locate enemy planes using the senses of sight and sound. With the advent of detection apparatuses (for example, radar) that extend beyond the pilot's range of vision, the pilot has access to additional information. This information is provided to the pilot using a head's-up display.

But the information provided can often be overwhelming. Even in the early days of air travel, without the development of technologies such as radar, a pilot had a great deal of data he must process visually: visually checking the skies for their current condition; checking instruments for current elevation, the current roll, pitch, and yaw of the aircraft, the speed of the aircraft, current fuel reserves, and so on. Specialized pilots might also have to keep track of additional information: for example, a military pilot needs to know how much weaponry he is still carrying.

The use of head's up displays can reduce the number of different places a pilot has to look at to gather the information he needs. Instead of looking for a particular instrument in the cockpit, the pilot just looks at a particular location on the head's-up display. But as more and more information is conveyed to the pilot, he has to look at more places in the head's-up display to find everything he needs to know, and he has to process all the visual information to understand what the data represents.

A need remains for a way to address these and other problems associated with the prior art.

DETAILED DESCRIPTION

Figure 1:
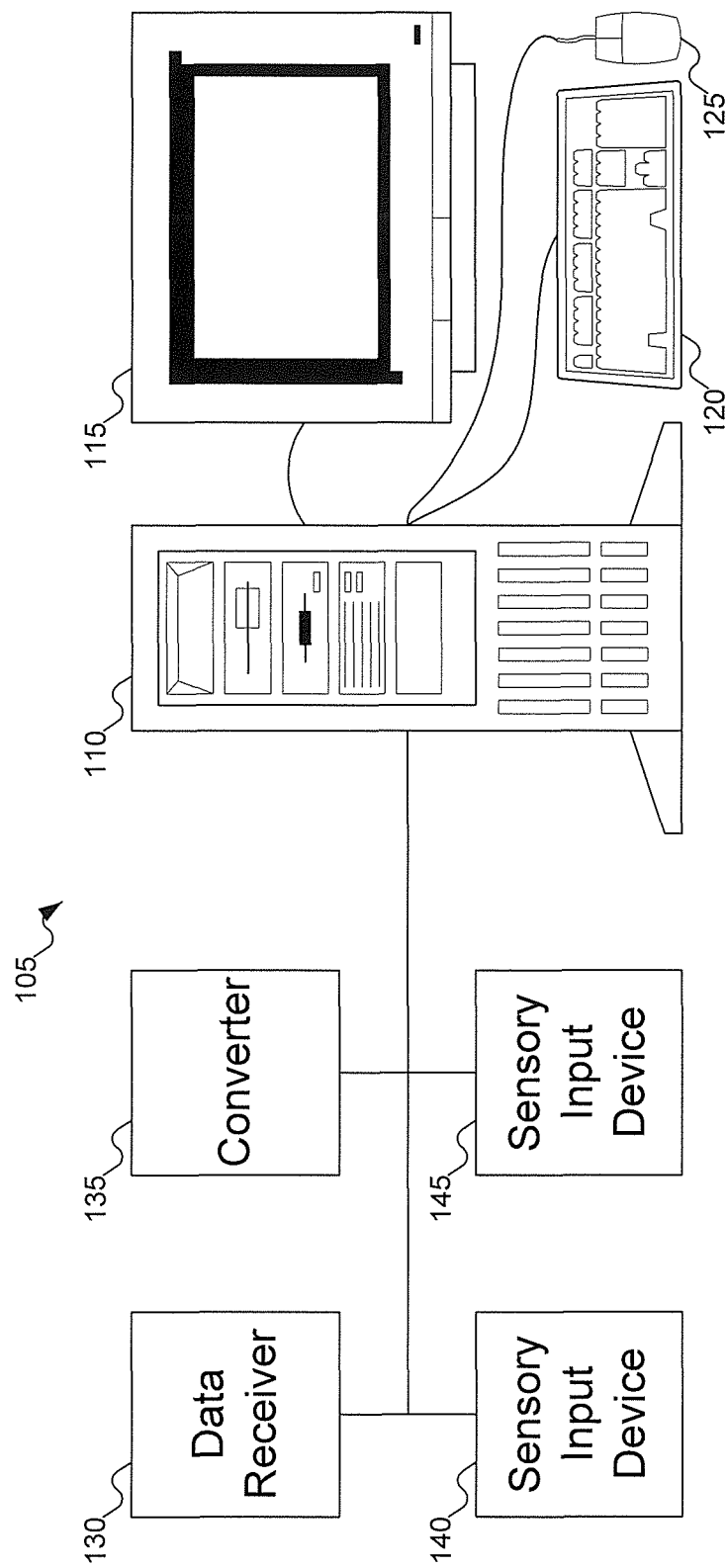
FIG. 1 shows a system for performing data processing as an enactive perception device, according to an embodiment of the invention.

Consider a soldier in a combat environment. The soldier needs situational awareness. He needs to keep track of the totality of his environment: not simply what he can see in front of him with his eyes. He needs to know where the rest his unit is located, relative to his location. He needs to know how much ammunition he is currently carrying. He needs to know about dangers in his environment: for example, if there are trace chemicals indicating an explosive device is in the vicinity. And so on.

The soldier can survey his environment and keep aware of his teammates' locations by constantly moving his head around, looking in all directions. But this is both tiring and dangerous, as the motion might be noticed by enemies. The soldier can keep track of his ammunition in his head, but this information is easily forgotten in the heat of the battle. And unless his senses are particularly sensitive, he is unlikely to detect dangers in the environment, such as trace chemicals that can be smelled.

An enactive perception device, according to embodiments of the invention, permits a user, such as the soldier, to process information more efficiently. An enactive perception device can use sensory substitution to provide a user with information about his environment. For example, movement behind the soldier can be detected using cameras and infrared sensors; when detected, the soldier can be alerted to the movement by stimulation of a muscle, such as the soldier's trapezius muscle. Chemical sensors can be used to detect chemical traces, which can be translated into tongue stimulation to alert the soldier to the chemical traces. Ammunition status can be determined tracking how many rounds of ammunition have been fired relative to the soldier's original load, and status can be provided by muscle stimulation of the abdomen. And so on.

The advantage of using an enactive perception device is that the soldier can provided with information using different senses. Rather than the soldier having to specifically search for information (e.g., searching the arena for teammates, or checking his remaining ammunition), the information can be determined automatically and provided to the soldier in a manner he can process.

Further, by providing different sensations in different ways, the user automatically knows what information is being conveyed, without having to process the information mentally. To use a different example, fighter pilots get their information via various instruments (e.g., altimeter, fuel gauge, compass, etc.), sometimes in combination with heads-up displays. The fighter pilot then has to mentally process the information he receives visually to identify a particular piece of information. For example, to determine the airplane's current ammunition status in the prior art, the pilot has to visually find the information (either from an instrument in the instrument panel or from a section of the heads-up display). But using an enactive perception device according to embodiments of the invention, the fighter pilot can know when he is running low on ammunition when he feels the muscle stimulation of a particular part of the body (e.g., the abdomen). This sensation is unique: a stimulation of the abdomen would not be confused with a stimulation of another muscle of the body. Thus, the fighter pilot can more quickly process information, via its translation to a different sensation, which avoids the need for the fighter pilot to mentally process the visual information to discern the pertinent data.

From the above discussion, it can be understood that an enactive perception device allows a user to integrate perception and action. An enactive perception device enhances a user's ability to perceive his environment and act on it to change his environment and to perceive the change in faster, richer, and more differentiated ways. An enactive perception device provides contextually relevant information in addition to sensory information, and can utilize all sensory mechanisms available to the user.

An advantage of the enactive perception device is that the enactive perception device can interface with underutilized sensory mechanisms to provide relevant stimulus to the user. An enactive perception device can also provide information that is both local and remote to the user. For example, in the soldier example discussed above, the soldier's ammunition load can be local information, but information about where supporting units (e.g., artillery) might be located can be remote information: for example, provided from headquarters.

An enactive perception device according to embodiments of the invention can include components that are worn by the user as part of armor or a uniform, as discussed above. But it is equally viable for the enactive perception device to be something that the user contacts, but is not worn. For example, an enactive perception device can be fitted into the steering wheel and car set of an automobile, providing the user with information only when the user is touching the steering wheel or the car seat. Such an enactive perception device can provide the user with information about traffic conditions, and suggest a direction to travel. For example, when the time is right for the user to make a turn, the enactive perception device can stimulate a muscle on the appropriate side of the body or the steering wheel, indicating the direction to turn. Such an enactive perception device can provide complementary information to a navigation device.

An enactive perception device according to embodiments of the invention can also provide information that is dependent on other factors. For example, an enactive perception device can include a wrist band or other sensor device. The location of the wrist band or sensor device can indicate what information should be provided. If the wrist band or sensor device is in front of the user's body, the enactive perception device can provide prospective information; if the wrist band or sensor device is behind the user's body, the enactive perception device can provide retrospective information. The relative location of the wrist band or sensor device can be determined using any desired technology: for example, Bluetooth® technology can be used to determine the relative location of the wrist band or sensor device to the user's body. (Bluetooth is a registered trademark of Bluetooth SIG, Inc.)

FIG. 1 shows a system for performing data processing as an enactive perception device, according to an embodiment of the invention. FIG. 1 shows machine 105, which can be, for example, a server or a user's personal computer. In FIG. 1, machine 105 is shown as including computer 110, monitor 115, keyboard 120, and mouse 125. A person skilled in the art will recognize that other components can be included with machine 105: for example, other input/output devices, such as a printer. In addition, FIG. 1 machine 105 can include conventional internal components (not shown): for example, a central processing unit, a memory, storage, etc. Although not shown in FIG. 1, a person skilled in the art will recognize that machine 105 can interact with other machine, either directly or over a network (not shown) of any type.

Machine 105 includes data receiver 130, converter 135, and sensory input devices 140 and 145. Data receiver 130 can receive data from a data source. Converter 135 can convert the data into a sensory input form, which can then be provided to sensory input devices 140 and 145. A user wearing sensory input devices 140 and 145 can then receive the data as sensory input.

The reader will understand that FIG. 1 is a very simple representation of the enactive perception device, and that the enactive perception device can take other forms. For example, the drawings of U.S. Provisional Patent Application Ser. No. 61/501,953, titled "ENACTIVE PERCEPTION DEVICE", filed Jun. 28, 2011, which is herein incorporated by reference for all purposes, show various forms an enactive perception device can take for a soldier, a fighter pilot, a race car driver, a knowledge worker, and a regular driver. But distilled to its most basic form, the enactive perception device permits the translation of information and sensory data from one form to another, so that the information and sensory data can be conveyed to the user, as described above.

Although FIG. 1 shows machine 105 as a conventional desktop computer, a person skilled in the art will recognize that computer system 105 can be any type of machine or computing device capable of providing the services attributed herein to machine 105, including, for example, a laptop computer, a personal digital assistant (PDA), or a cellular telephone. In addition, machine 105 can be worn by the user, using a form factor appropriate to the user's needs. For example, if the user is a soldier, machine 105 can take the form of a special purpose computer that fits into a compartment in the user's gear.

While FIG. 1 shows the various components as being grouped together, a person of ordinary skill in the art will recognize the embodiments of the invention can separate the components. For example, data receiver 130 and converter 135 can be included with machine 105, but sensory input devices 140 and 145 can be located elsewhere. For example, machine 105 might be located remotely from the user, who can wear sensory input devices 140 and 145. Machine 105 might then also include any necessary components to achieve communication between the separated components.

Figure 2:
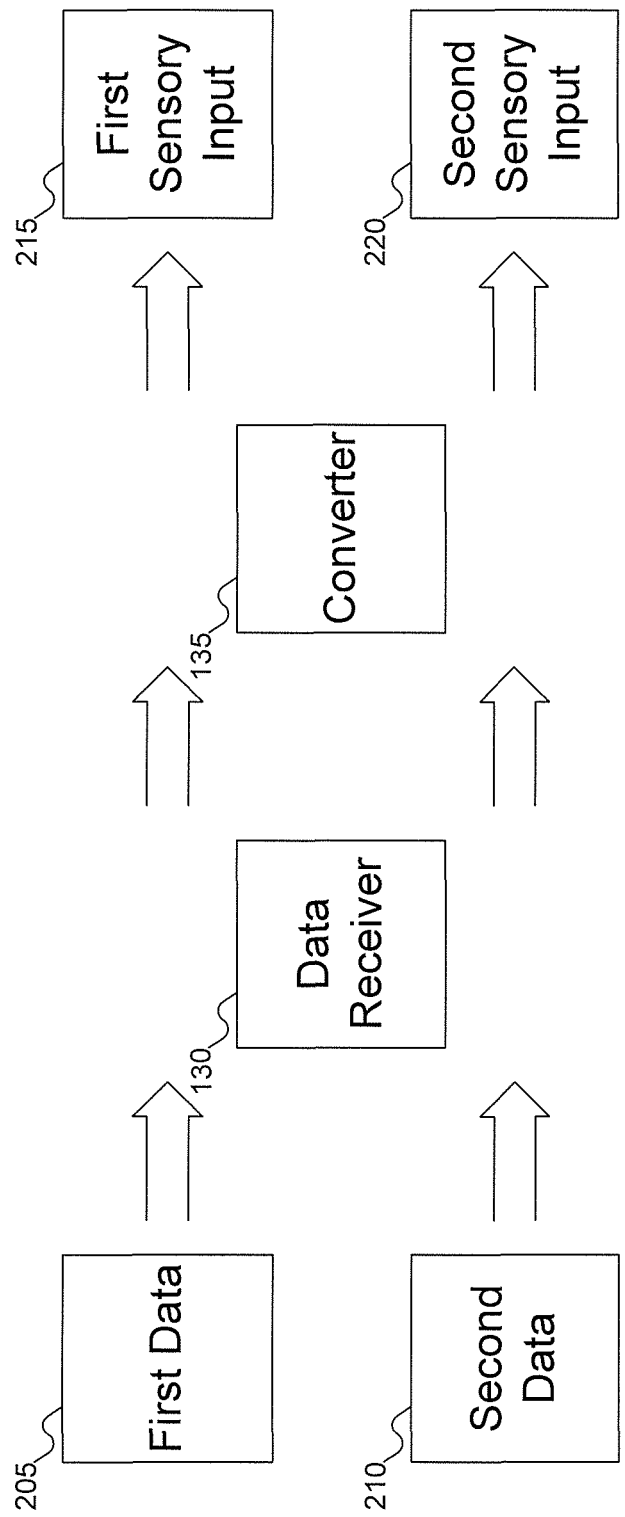
FIG. 2 shows data flow in the enactive perception device of FIG. 1.
Figure 3:
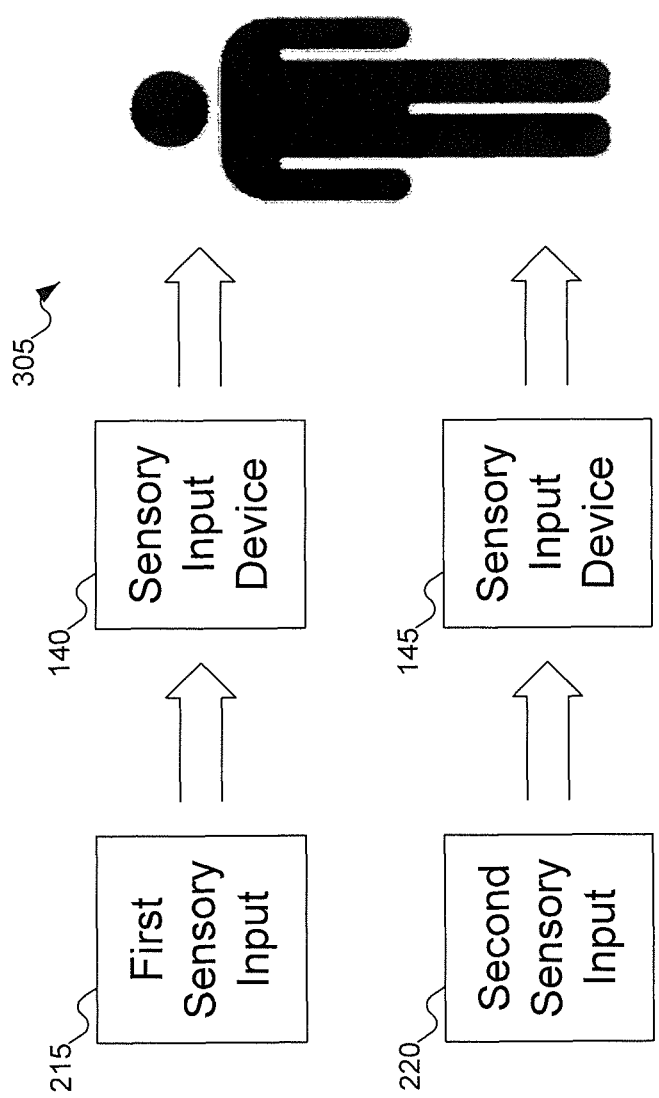
FIG. 3 shows a user receiving data using the enactive perception device of FIG. 1.

FIG. 2 shows data flow in the enactive perception device of FIG. 1. In FIG. 2, data 205 and 210 are received by data receiver 130. Data 205 and 210 are then passed to converter 135, which converts the data into sensory inputs 215 and 220. These sensory inputs can then be provided to sensory input devices 140 and 145, so that the sensory inputs can be provided to the user (as shown in FIG. 3).

Figure 4:
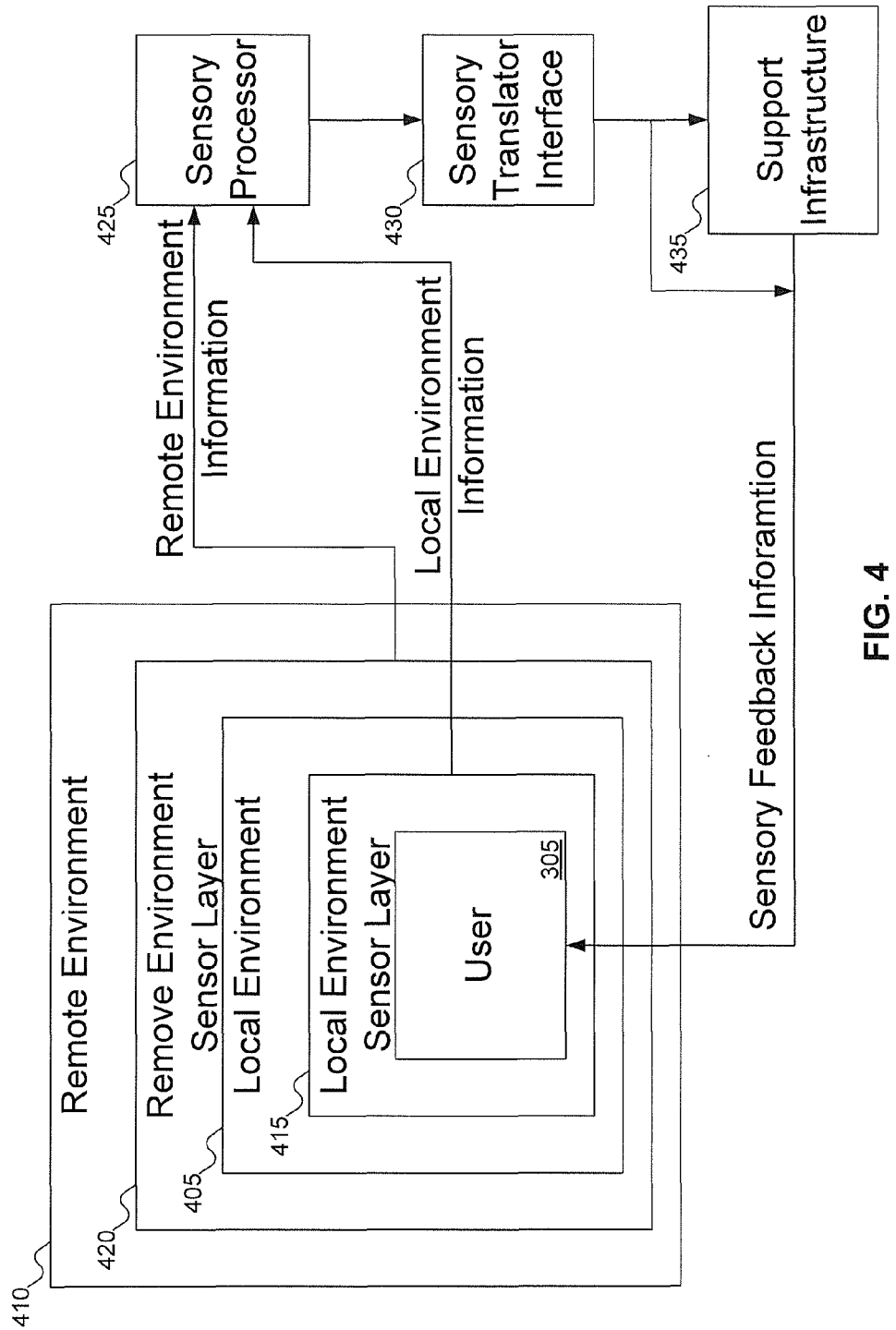
FIG. 4 shows feedback of the enactive perception device of FIG. 1 in an environment.

FIG. 4 shows feedback of the enactive perception device of FIG. 1 in an environment. In FIG. 4, user 305 has contact with local environment 405 and remote environment 410. The enactive perception device includes local environment sensor layer 415, which can provide information about local environment 405, and remote environment sensory layer 420, which can provide information about remote environment 410.

Information from both local environment sensor layer 415 and remote environment sensor layer 420 is forwarded to sensory processor 425, and then to sensory translator interface 430. (The combination of sensory processor 425 and sensory translator interface can form converter 135 as described with reference to FIG. 1 above.) Support infrastructure 435 can then be used to provide sensory feedback information to user 305. Sensory feedback information can also be provided to user 305 from sensory translator interface 430, without going through support infrastructure 435.

Figure 5:
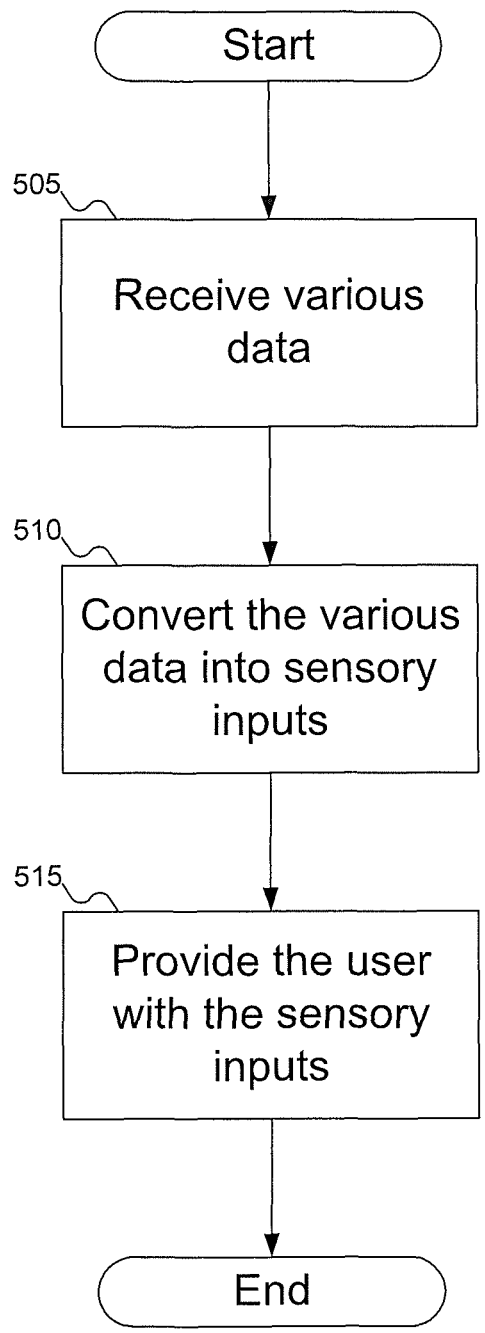
FIG. 5 shows a flowchart of a procedure for processing data using the enactive perception device of FIG. 1, according to an embodiment of the invention.

FIG. 5 shows a flowchart of a procedure for processing data using the enactive perception device of FIG. 1, according to an embodiment of the invention. In FIG. 5, at block 505, data are received by the system. At block 510, the data are converted into sensory inputs. At block 515, the sensory inputs are then provided to the user.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other non-transitory storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
    a data receiver to receive a first data as a first sensory data and a second data as a second sensory data;
    a converter to convert said first data into a first sensory input and said second data into a second sensory input;
    a first sensory input device to provide a user with said first sensory input; and
    a second sensory input device to provide said user with said second sensory input,
    where said first sensory input and said second sensory input can be perceived by said user without said user having to distinguish between said first sensory input and said second sensory input and where said first sensory input and said second sensory input use different human senses.

2. A system according to claim 1, wherein the data receiver includes a second data receiver to receive said second data.

3. A system according to claim 1, wherein said second sensory input is different from said first sensory input.

4. A system according to claim 1, wherein the converter is operative to convert said first sensory data into a first sensory input and said second sensory data into a second sensory input, where said first sensory input is perceived by said user using a different sense than said first sensory data and said second sensory input perceived by said user using a different sense than said second sensory data.

5. A system according to claim 1, wherein the data receiver is operative to receive said first data and said second data dependent on a relative location of a sensor device.

6. A system according to claim 1, wherein the first sensory input device is designed to be worn by said user.

7. A method comprising:
    receiving a first data from a first data input;
    receiving a second data from a second data input, the second data input different from the first data input;
    converting the first data into a first sensory input;
    converting the second data into a second sensory input; and
    providing a user with the first sensory input and the second sensory input via at least one sensory input device designed to be worn by the user,
    where the first sensory input and the second sensory input can be perceived by the user without the user having to distinguish between the first sensory input and the second sensory input and where said first sensory input and said second sensory input use different human senses.

8. A method according to claim 7, wherein converting the second data into a second sensory input includes converting the second data into the second sensory input, the second sensory input different from the first sensory input.

9. A method according to claim 7, wherein receiving a first data and a second data includes receiving a first sensory data and a second sensory data.

10. A method according to claim 9, wherein:
    converting the first data into a first sensory input includes converting the first sensory data into a first sensory input, the first sensory input perceived by the user using a different sense than the first sensory data; and
    converting the second data into a second sensory input includes converting the second sensory data into a second sensory input, the second sensory input perceived by the user using a different sense than the second sensory data.

11. A method according to claim 7, wherein receiving a first data and a second data includes receiving the first data and the second data, the first data and the second data dependent on a relative location of a sensor device.

12. An article, comprising a non-transitory storage medium, said non-transitory storage medium having stored thereon instructions that, when executed by a machine, result in:
   receiving a first data from a first data input;
   receiving a second data from a second data input, the second data input different from the first data input;
   converting the first data into a first sensory input;
   converting the second data into a second sensory input; and
   providing a user with the first sensory input and the second sensory input,
   where the first sensory input and the second sensory input can be perceived by the user without the user having to distinguish between the first sensory input and the second sensory input and where said first sensory input and said second sensory input use different human senses.

13. An article according to claim 12, wherein converting the second data into a second sensory input includes converting the second data into the second sensory input, the second sensory input different from the first sensory input.

14. An article according to claim 12, wherein receiving a first data and a second data includes receiving a first sensory data and a second sensory data.

15. An article according to claim 14, wherein:
   converting the first data into a first sensory input includes converting the first sensory data into a first sensory input, the first sensory input perceived by the user using a different sense than the first sensory data; and
   converting the second data into a second sensory input includes converting the second sensory data into a second sensory input, the second sensory input perceived by the user using a different sense than the second sensory data.

16. An article according to claim 12, wherein receiving a first data and a second data includes receiving the first data and the second data, the first data and the second data dependent on a relative location of a sensor device.

17. An article according to claim 12, wherein providing a user with the first sensory input and the second sensory input includes providing the user with the first sensory input via a sensory input device designed to be worn by the user.

* * * * *